(12) United States Patent
Shido

(10) Patent No.: US 6,718,593 B2
(45) Date of Patent: Apr. 13, 2004

(54) WIPER DEVICE

(75) Inventor: Toshio Shido, Chieti (IT)

(73) Assignee: ASMO Co., Ltd., Shizuoka (JP)

( * ) Notice: Subject to any disclaimer, the term of this patent is extended or adjusted under 35 U.S.C. 154(b) by 328 days.

(21) Appl. No.: 10/019,206

(22) PCT Filed: Apr. 6, 2001

(86) PCT No.: PCT/JP01/02993
§ 371 (c)(1),
(2), (4) Date: Dec. 19, 2001

(87) PCT Pub. No.: WO01/79045
PCT Pub. Date: Oct. 25, 2001

(65) Prior Publication Data
US 2002/0162184 A1 Nov. 7, 2002

(30) Foreign Application Priority Data
Apr. 19, 2000 (JP) ........................ 2000-118388

(51) Int. Cl.⁷ ............... B60S 1/06; B60S 1/04
(52) U.S. Cl. ............ 15/250.31; 15/250.3; 29/469.5; 29/518; 403/274; 403/301; 285/382; 285/256; 384/295
(58) Field of Search .................. 15/250.3, 250.31, 15/250.14, 250.27; 29/516, 517, 518, 469.5; 403/267, 300, 301, 274; 384/295; 285/382, 256

(56) References Cited

U.S. PATENT DOCUMENTS 5,536,100 A * 7/1996 Kiefer .................. 403/274
5,820,286 A * 10/1998 Karl et al. ............ 403/256
6,196,754 B1 * 3/2001 Bruemmer et al. ..... 403/279
6,353,991 B1 * 3/2002 Dehghan-Manshadi et al. ........... 29/516

FOREIGN PATENT DOCUMENTS

| DE | 2920899 A | 1/1981 |
|----|-----------|--------|
| JP | 3-503876 | 2/1990 |
| JP | 5-32153 | 2/1993 |
| JP | 8-156747 | 12/1994 |
| JP | 2000-52938 | 8/1998 |

\* cited by examiner

Primary Examiner—Gary K. Graham
(74) Attorney, Agent, or Firm—Sheridan Ross PC

(57) ABSTRACT

A wiper device has a pair of pivot holders each of which supports a pivot shaft and a pipe frame that connects the pivot holders to each other. When each pivot holder is fitted in an end of the pipe frame, the pipe frame is subjected to caulking to engage the pipe frame with recesses that are formed in the surfaces of the pivot holders. Each recess is shaped and located such that the open angle of the recess is constantly greater than zero and equal to or greater than the shaft angle of the corresponding pivot shaft, as viewed along any cross-sectional plane that includes a normal line corresponding to a maximum depth portion of the recess. As a result, the pivot holders are secured to the pipe frame easily and reliably, and the pivot holders are manufactured with a reduced cost.

18 Claims, 6 Drawing Sheets

WIPER DEVICE

BACKGROUND OF THE INVENTION

The present invention relates to wiper devices that wipe vehicle windows.

BACKGROUND OF THE INVENTION

A wiper device of a vehicle includes a wiper arm attached to a pivot shaft. The pivot shaft pivots the wiper arm in a predetermined angular range to wipe a window.

Japanese Unexamined Patent Publication No. 8-156747 discloses a module type wiper device with a pair of wiper arms that move synchronously. This wiper device includes a pair of pivot holders each of which support a pivot shaft. A pipe frame connects the pivot holders to each other. The wiper arms are attached to the associated pivot shafts.

The pivot holders are secured to opposite ends of the pipe frame through caulking. More specifically, as shown in FIGS. 8 and 9, each pivot holder includes a fitting portion 110 that is fitted in a pipe frame 100. Eight recesses 111, as a whole, are formed in the outer side of the fitting portion 110. That is, four recesses 111 are spaced from the remaining four recesses 111 at predetermined intervals in an axial direction of the fitting portion 110. Each recess 111 forms a pair with one of the recesses 111 that are axially spaced.

A pair of press dies 120 with a plurality of pressing portions 121 that correspond to the recesses ill are prepared. After the fitting portion 110 is fitted in the pipe frame 100, the pressing portions 121 of each press die 120 press the outer side of the pipe frame 100. This deforms a portion of the pipe frame 100 that corresponds to each recess 111 such that the deformed portion enters the recess 111, thus securing the pivot holder to the pipe frame 100.

As shown in FIG. 9, the two corresponding recesses 111 that are spaced from each other in an axial direction of the fitting portion 110 each have a side wall 111a. The side walls 111a of these recesses 111 face in opposite directions and are parallel with each other. Further, as shown in FIG. 8, the two corresponding recesses 111 adjacent to each other in a circumferential direction of the fitting portion 110 each have a side wall 111b. The side walls 111b of these recesses 111 face in opposite directions and are parallel with each other. The side walls 111a, 111b are parallel with a movement direction of each press die 120. In addition, if the pivot holder is formed using a pair of separate molds through aluminum die casting or the like, the molds must be separated from each other in a direction parallel with the side walls 111a, 111b for isolating the pivot holder from the molds. However, it is complicated to design and fabricate the molds such that a separating direction of each mold is precisely parallel with the side walls 111a, 111b. Further, the designing of the molds is restricted.

To reliably stop the pivot holder from becoming loose with respect to the pipe frame 100, a caulking portion of the pipe frame 100 must be in secure contact with the inner wall of each recess 111. As shown in FIG. 9, a cross-sectional shape of each recess 111 in an axial direction of the fitting portion 110 is rectangular. That is, a corner portion of the inner wall of each recess 111 (in FIG. 9, a corner portion between each side wall 111a and the bottom of the recess 111) is relatively squared The corner portions of each pressing portion 121 thus must be relatively squared to ensure that the caulking portion of the pipe frame 100 is in secure contact with the inner wall of each recess 111. In this case, when each pressing portion 121 plastically deforms the pipe frame 100, reactive force may act focally on a portion of the pipe frame 100 that corresponds to each corner portion of the pressing portion 121, thus causing a crack. Further, the corner portions of each pressing portion 121 quickly wear, and a desired securing strength of the pressing portion 121 is hampered at an early stage.

In a wiper device disclosed in Japanese Unexamined Patent Publication No. 5-32153, two pivot holders are each secured to an end of a pipe frame through a bolt. Each pivot holder has a shaft hole that receives a pivot shaft and a through hole through which the bolt is passed. The axis of the shaft hole is parallel with the axis of the through hole. In this case, each pivot holder can be isolated from a pair of molds, which form the pivot holder, by separating the molds from each other along the axis of the shaft hole and the axis of the through hole, when molding is completed. In other words, the molds must be designed and fabricated with high accuracy such that a movement direction of each mold, the axis of the shaft hole, and the axis of the through hole are completely parallel with one another. Like the prior art shown in FIGS. 8 and 9, this complicates the fabrication of the molds and restricts the designing of the same. Further, as long as the axis of the shaft hole is parallel with the axis of the through hole, the pivot holder cannot be generally used. In addition, it is troublesome to secure each pivot holder to the pipe frame through the bolt.

SUMMARY OF THE INVENTION

Accordingly, it is an objective of the present invention to provide a wiper device that enables a pivot holder to be secured to a pipe frame easily and reliably and allows the pivot holder to be manufactured with a reduced cost.

To achieve the above objective, a wiper device according to the present invention includes a pair of pivot holders each including a fitting portion that extends along a fitting axis, a pivot shaft that is rotationally supported by each pivot holder, and a frame that connects the pivot holders to each other. A plurality of recesses are formed in an outer side of each fitting portion. A wiper arm is secured to each pivot shaft. A receiving portion in which each fitting portion is received is formed at each end of the frame. The receiving portions are subjected to caulking with the fitting portions received in the corresponding receiving portions, such that a portion of each receiving portion that corresponds to each recess enters the recess. Each recess includes a curved bottom and a curved open end. Regarding each pivot holder, an angle between a normal line that corresponds to a maximum depth portion of each recess and a tangential line that corresponds to the open end of the recess is defined as an open angle. Further, an angle between the axis of the corresponding pivot shaft and the normal line is defined as a shaft angle. In this case, each recess is shaped and located such that the open angle is constantly greater than zero and equal to or greater than the shaft angle, as viewed along any cross-sectional plane that includes the normal line.

Another wiper device according to the present invention includes a pair of pivot holders each including a fitting portion that extends along a fitting axis, a pivot shaft that is rotationally supported by each pivot holder, and a frame that connects the pivot holders to each other. A plurality of recesses are formed in an outer side of each fitting portion. A wiper arm is secured to each pivot shaft. A receiving portion in which each fitting portion is received is formed at each end of the frame. The receiving portions are subjected to caulking with the fitting portions received in the corresponding receiving portions, such that a portion of each receiving portion that corresponds to each recess enters the recess. Each recess includes a curved bottom. Regarding each pivot holder, an angle between a normal line that corresponds to a maximum depth portion of each recess and a certain portion of a wall that forms the recess is defined as an open angle. Further, an angle between the axis of the corresponding pivot shaft and the normal line is defined as a shaft angle. In this case, each recess is shaped and located such that the open angle is constantly greater than zero and equal to or greater than the shaft angle, as viewed along any cross-sectional plane that includes the normal line.

DETAILED DESCRIPTION OF THE PREFERRED EMBODIMENTS

Figure 1:
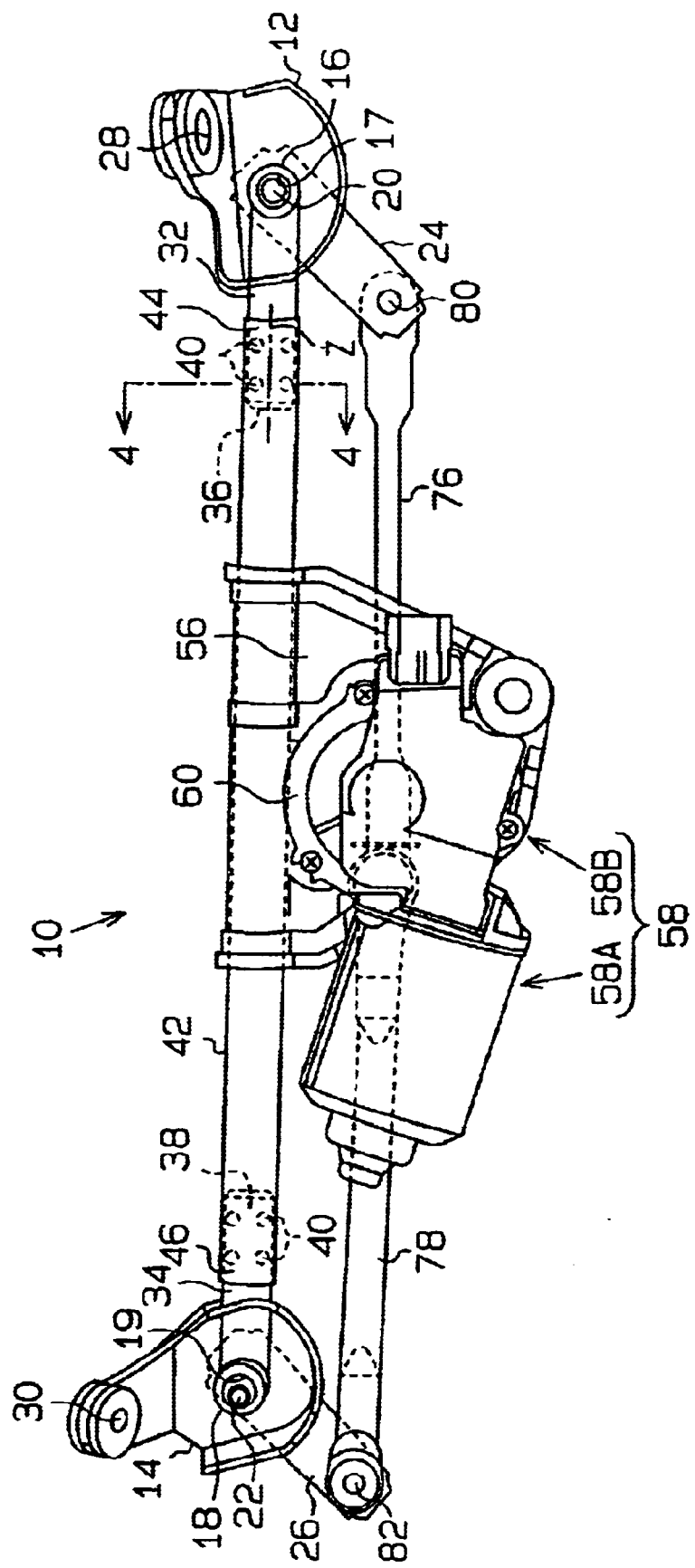
FIG. 1 is a plan view showing a wiper device of an embodiment according to the present invention, as a whole.
Figure 2:
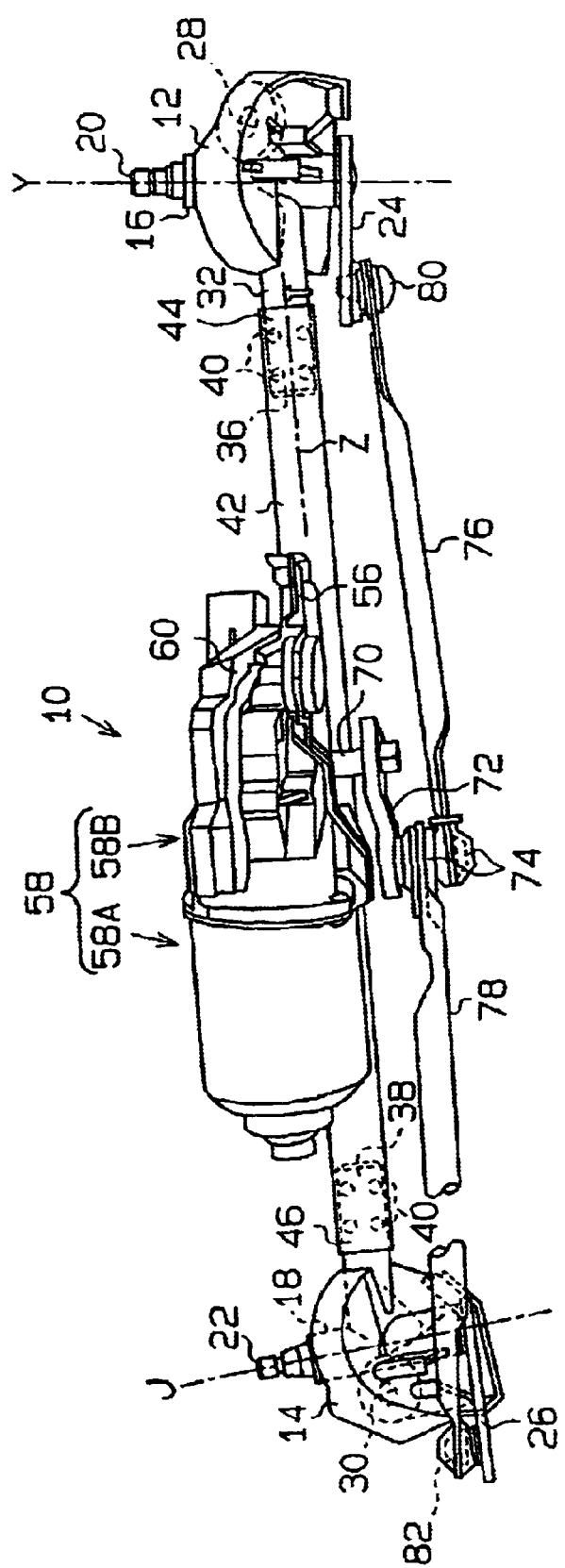
FIG. 2 is a front view showing the wiper device of FIG. 1.

An embodiment of the present invention will now be described with reference to FIGS. 1 to 7. As shown in FIGS. 1 and 2, a wiper device 10 includes a pair of pivot holders 12, 14 and a hollow cylindrical metal pipe frame 42. The pipe frame 42 connects the pivot holders 12, 14 to each other. The pivot holders 12, 14 are basically identical and are formed of aluminum or its alloy. Alternatively, the pivot holders 12, 14 may be formed of synthetic resin through molding. The pivot holders 12, 14 have attachment holes 28, 30, respectively. A bolt (not shown) is passed through each attachment hole 28, 30 to secure the wiper device 10 to a vehicle body.

The right pivot holder 12 integrally includes a support cylinder 16 that has a shaft hole 17. Similarly, the left pivot holder 14 integrally includes a support cylinder 18 that has a shaft hole 19. Right and left pivot shafts 20, 22 are respectively passed through the shaft holes 17, 19 and are rotationally supported by the associated support cylinders 16, 18. Each pivot shaft 20, 22 is coaxial with the associated shaft hole 17, 19. In FIG. 2, the axis Y corresponds to the axis of the shaft hole 17 or the right pivot shaft 20, and the axis J corresponds to the axis of the shaft hole 19 or the left pivot shaft 22.

A pair of wiper arms (not shown) are respectively secured to the upper ends of the pivot shafts 20, 22, which project from the associated support cylinders 16, 18. A right pivot lever 24 is secured to the lower end of the right pivot shaft 20, which projects from the support cylinder 16. Likewise, a left pivot lever 26 is secured to the lower end of the left pivot shaft 22, which projects from the support cylinder 18.

The pivot holders 12, 14 respectively include connecting shafts 32, 34 that project from axial intermediate portions of the associated support cylinders 16, 18. Each connecting shaft 32, 34 is a solid shaft that has a circular cross-sectional shape. The distal end of the connecting shaft 32 forms a fitting portion 36 fitted in one axial end of the pipe frame 42, and the distal end of the connecting shaft 34 forms a fitting portion 38 fitted in the other axial end of the pipe frame 42. The pipe frame 42 and the connecting shafts 32, 34 are coaxial.

As shown in FIGS. 1 to 5, a pair of recess groups, each of which includes four recesses 40, are formed in the outer sides of the fitting portions 36, 38. The recesses 40 of one group are spaced from the recesses 40 of the other at predetermined intervals in an axial direction of each fitting portion 36, 38. The recesses 40 of each group are spaced from one another at predetermined angular intervals.

Figure 7:
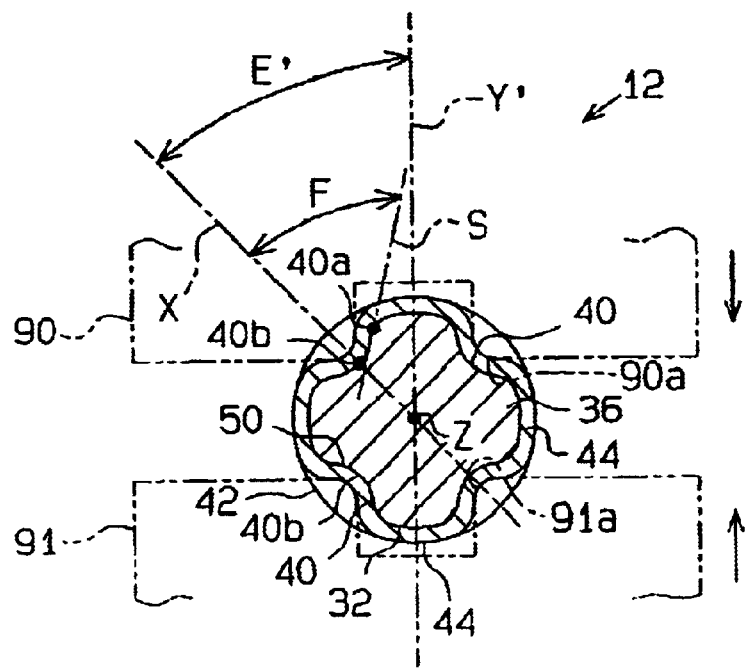
FIG. 7 is a cross-sectional view showing the pipe frame being secured to the pivot holder through caulking with a pair of press dies.
Figure 8:
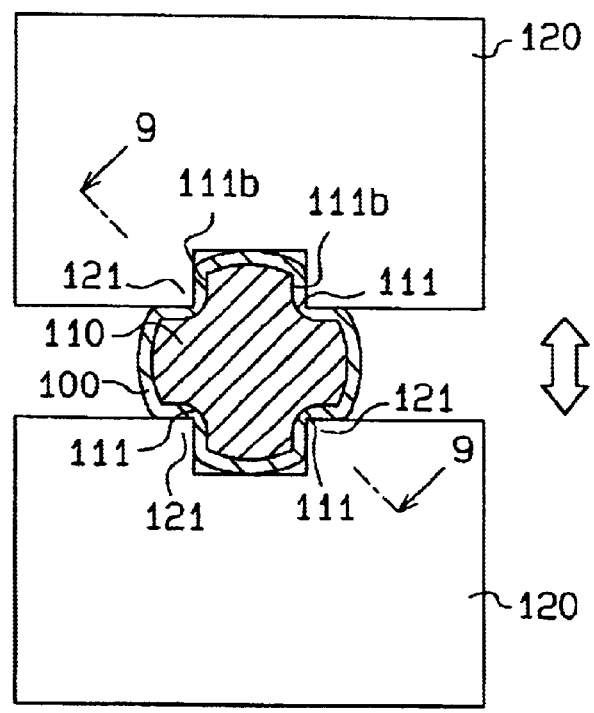
FIG. 8 is a cross-sectional view taken along line 8—8 of FIG. 9 and showing a pipe frame being secured to a pivot holder through caulking in a prior art device.
Figure 9:
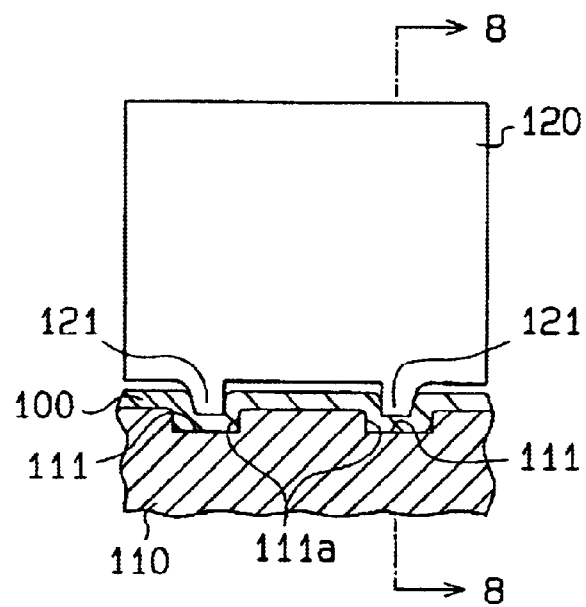
FIG. 9 is a cross-sectional view taken along line 9—9 of FIG. 8.

The axial opposite ends of the pipe frame 42 form receiving portions 44, 46 that respectively receive the fitting portions 36, 38. Thus, after each fitting portion 36, 38 is fitted in the associated receiving portion 44, 46, caulking is performed on the receiving portions 44, 46 with a pair of press dies 90, 91, which are illustrated in FIG. 7. This plastically deforms a portion of each receiving portion 44, 46 that corresponds to each recess 40, thus ensuring that the deformed portion enters the recess 40. Each deformed portion of the receiving portions 44, 46 forms a radial inward projection 50. Engagement between the projections 50 and the associated recesses 40 joins each pivot holder 12, 14 to the pipe frame 42 (see FIGS. 4 and 5).

Figure 4:
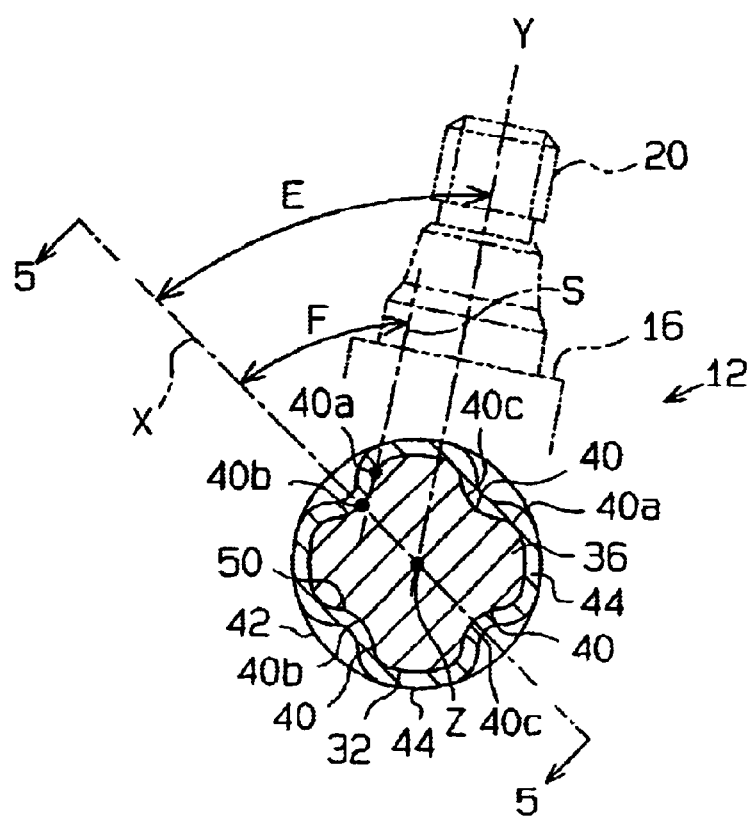
FIG. 4 is a cross-sectional view taken along line 4—4 of FIG. 1 and showing a portion at which a pivot holder is connected to a pipe frame.
Figure 5:
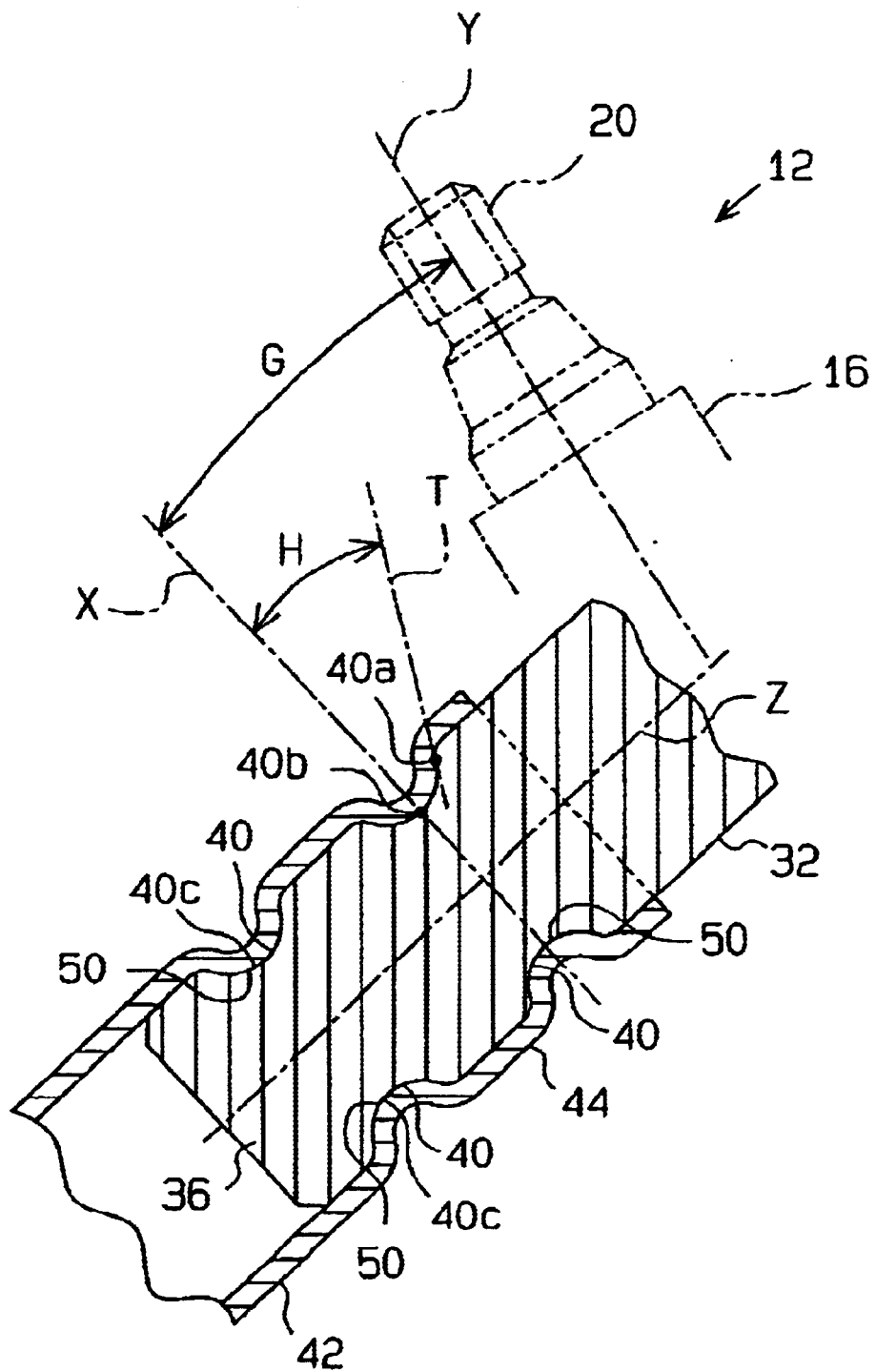
FIG. 5 is a cross-sectional view taken along line 5—5 of FIG. 4.

As shown in FIG. 4 and 5, each recess 40 has a substantially conical shape. A bottom 40c of each recess 40 forms a curved surface, or, preferably, a portion of a spherical surface. Further, the entire wall of each recess 40 may form a portion of a spherical surface. An opening end 40a of each recess 40 is curved. It is preferred that the opening end 40a of each recess 40 has an arched cross-sectional shape. Each opening end 40a is smoothly connected to a corresponding portion of the outer sides of the fitting portions 36,38.

In this embodiment, the recesses 40 are shaped and located to satisfy the following conditions. More specifically, regarding each pivot holder 12, 14, a line that corresponds to a maximum depth portion 40b of each recess 40 is defined as a normal line X. The angle between the normal line X and a tangential line that corresponds to the opening end 40a of the corresponding recess 40 is defined as an open angle. Further, the angle between the normal line X and the axis Y, J of the corresponding pivot shaft 20, 22 is defined as a shaft angle. Each recess 40 is shaped and located such that the open angle is constantly greater than zero and equal to or greater than the shaft angle, as viewed along any cross-sectional plane that includes the normal line X.

FIGS. 4 and 5 show two of the numerous views of a certain recess 40 taken along cross-sectional planes that include the normal line X. FIG. 4 is a cross-sectional view showing the portion at which the connecting shaft 32 of the right pivot holder 12 is connected to the pipe frame 42, as taken along the plane that is perpendicular to the axis Z of the connecting shaft 32 and corresponds to the maximum depth portion 40b of the recess 40. As viewed in FIG. 4, or as the right pivot holder 12 is viewed along the axis Z of the connecting shaft 32, the angle between the normal line X, which corresponds to the maximum depth portion 40b of the recess 40, and the tangential line S, which corresponds to the opening end 40a of the recess 40, is defined as a first open angle F. Further, the angle between the axis Y of the right pivot shaft 20 (the shaft hole 17) and the normal line X is defined as a first shaft angle E. Each recess 40 is shaped and located to satisfy the following conditions: F>0 and F≧E. The normal line X and the tangential line S of FIG. 4 are located on a plane perpendicular to the axis Z.

FIG. 5 is a cross-sectional view showing the portion at which the connecting shaft 32 of the right pivot holder 12 is connected to the pipe frame 42, as taken along a plane that includes the axis Z of the connecting shaft 32 and corresponds to the maximum depth portion 40b of the recess 40. As viewed in FIG. 5, or as the right pivot holder 12 is viewed perpendicularly to the axis Z of the connecting shaft 32, the angle between the normal line X, which corresponds to the maximum depth portion 40b of the recess 40, and the tangential line T, which corresponds to the opening end 40a of the recess 40, is defined as a second open angle H. Further, the angle between the axis Y of the right pivot shaft 20 (the shaft hole 17) and the normal line X is defined as a second shaft angle G. Each recess 40 is shaped and located to satisfy the following conditions: H>0 and H≧G. The normal line X and the tangential line T of FIG. 5 are located on a plane that includes the axis Z.

In this embodiment, the first open angle F is greater than the first shaft angle E by a predetermined value, as shown in FIG. 4. The second open angle H is greater than the second shaft angle G by a predetermined value, as shown in FIG. 5.

Although not illustrated, like the open angle of each recess 40 of the right pivot holder 12, the open angle of each recess 40 of the left pivot holder 14 is constantly greater than zero and equal to or greater than the shaft angle of the left pivot shaft 22 (the shaft hole 19), as viewed along any cross-sectional plane that includes the corresponding normal line X.

Figure 3:
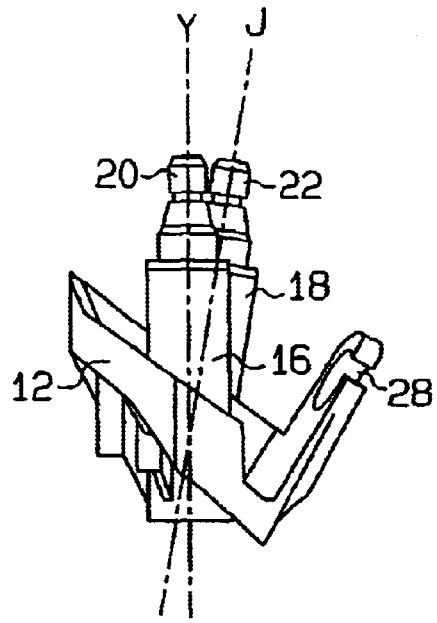
FIG. 3 is a side view showing a pair of pivot shafts of the wiper device of FIG. 1.

As shown in FIG. 3, each pivot holder 12, 14 is attached to the pipe frame 42 such that the axis Y of the pivot shaft 20 and the axis J of the pivot shaft 22 form a predetermined angle, as viewed along the axis of the pipe frame 42. Further, as shown in FIG. 2, the axis Y of the pivot shaft 20 and the axis J of the pivot shaft 22 form a predetermined angle, as viewed perpendicularly to the axis of the pipe frame 42. In other words, the axis Y of the pivot shaft 20 and the axis J of the pivot shaft 22 are non-parallel, as viewed from any direction.

Also, the open angle of each recess 40 of the right pivot holder 12 is equal to or greater than the shaft angle of the left pivot shaft 22, as viewed along any cross-sectional plane that includes the normal line X of the recess 40. Likewise, the open angle of each recess 40 of the left pivot holder 14 is equal to or greater than the shaft angle of the right pivot shaft 20, as viewed along any cross-sectional plane that includes the normal line X of the recess 40. In other words, the open angle of each recess 40 of one pivot holder is equal to or greater than the shaft angle of the corresponding pivot shaft and the shaft angle of the other pivot shaft, as viewed along any cross-sectional plane that includes the normal line X of the recess 40.

Figure 6:
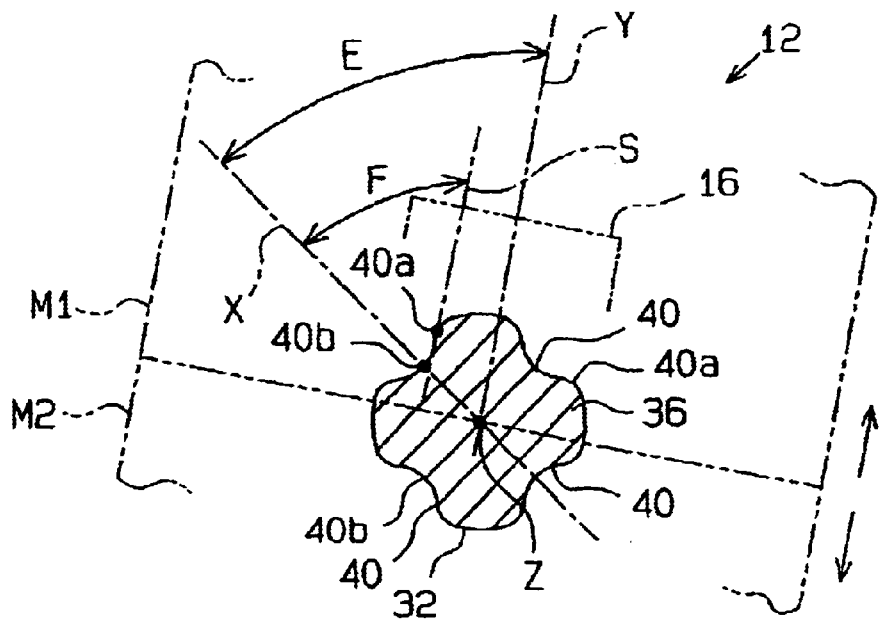
FIG. 6 is a cross-sectional view showing the pivot holder being formed using a pair of molds.

FIG. 6 schematically shows a pair of separate molds M1, M2 for molding the right pivot holder 12. As shown in the drawing, after molding the right pivot holder 12, the molds M1, M2 are separated from each other along a movement axis parallel with the axis Y of the shaft hole 17. Although not illustrated, the left pivot holder 14 is also formed with a pair of separate molds, like those of FIG. 6. After molding the left pivot holder 14, the molds are separated from each other along a movement axis parallel with the axis J of the shaft hole 19.

FIG. 7 schematically shows a pair of press dies 90, 91 for securing the right pivot holder 12 to the pipe frame 42. As shown in FIG. 7, the press dies 90, 91 respectively have a plurality of pressing portions 90a, 91a that correspond to the recesses 40. When caulking is performed, the press dies 90, 91 are moved toward each other along a predetermined movement axis Y' to press the receiving portion 44 of the pipe frame 42 with the pressing portions 90a, 91a. Although not illustrated, the left pivot holder 14 is also secured to the pipe frame 42 with a pair of press dies, like those of FIG. 7. When caulking is performed, the press dies are moved toward each other along a predetermined movement axis J'.

As shown in FIGS. 1 and 2, a wiper motor unit 58, which is a drive source, is secured to an axial intermediate portion of the pipe frame 42 through a bracket 56. The wiper motor unit 58 includes a motor 58A and a gear unit 58B. A housing 60 of the gear unit 58B is secured to the bracket 56.

A crank arm 72 is secured to the distal end of an output shaft 70 that projects from the gear unit 50B. A pair of link rods 76, 78 are connected to the distal end of the crank arm 72 through corresponding ball joints 74. The right link rod 76 is connected to the right pivot lever 24 through a ball joint 80. The left link rod 78 is connected to the left pivot lever 26 through a ball joint 82.

When the wiper motor unit 58 operates to rotate the crank arm 72, the pivot shafts 20, 22 rotate in a predetermined angular range through the associated link rods 76, 78 and the pivot levers 24, 26. This pivots the wiper arms connected to the pivot shafts 20, 22 to wipe the corresponding window of the vehicle.

The above-described wiper device 10 is a so-called module type wiper device that connects the two pivot holders 12, 14, which support the associated pivot shafts 20, 22, to each other through the pipe frame 42.

The illustrated embodiment has the following advantages.

Each recess 40 is shaped and located such that the open angle of the recess 40 is constantly greater than zero and equal to or greater than the shaft angle of the corresponding pivot shaft, as viewed along any cross-sectional plane that includes the normal line X of the recess 40. For example, as shown in FIG. 4, each recess 40 is shaped and located such that the first open angle F of the recess 40 is greater than zero and equal to or greater than the first shaft angle E, as each pivot holder 12, 14 is viewed along the axis Z of the associated connecting shafts 32, 34. Further, as shown in FIG. 5, each recess 40 is shaped and located such that the second open angle H of the recess 40 is greater than zero and equal to or greater than the second shaft angle G, as each pivot holder 12, 14 is viewed perpendicularly to the axis Z of the associated connecting shafts 32, 34.

As shown in FIG. 6, if the right pivot holder 12 is formed with the two separate molds M1, M2, the molds M1, M2 are separated from each other along the axis Y of the pivot shaft 20, or the shaft hole 17, after the molding is completed. Likewise, if the left pivot holder 14 is formed with the two separate molds (not shown), the molds are separated from each other along the axis J of the pivot shaft 22, or the shaft hole 19, after the molding is completed.

In this case, if the aforementioned condition (the open angle must be greater than zero and equal to or greater than the shaft angle) is satisfied, the recesses 40 do not cause undercut that hampers the separation of the molds. In other words, the recesses 40 may be shaped and located as desired as long as the condition is satisfied. It is simply required that the mold separating direction be parallel with the axis Y, J of each shaft hole 17, 19, and a relatively large error is accepted regarding the recesses 40.

Accordingly, the two separate molds, which are relatively inexpensive, are readily applied to molding of the pivot holders 12, 14. Even if each mold has a relatively low accuracy, the molds are smoothly separated from each other without damaging the completed pivot holders 12, 14. Further, designing of the molds becomes simple. As a result, the cost for the molds and the manufacturing cost of each pivot holder 12, 14 both decrease.

When the right pivot holder 12 is secured to the pipe frame 42, as shown in FIG. 7, the press dies 90, 91 are moved toward each other along the predetermine movement axis Y'. Likewise, when the left pivot holder 14 is secured to the pipe frame 42, the press dies (not shown) are moved toward each other along the predetermine movement axis J'.

The angle between the normal line X of each recess 40 of one pivot holder and the movement axis of the press dies for the pivot holder is defined as a die movement angle. For example, as shown in FIG. 7, which corresponds to a cross-sectional view of FIG. 4, the angle between the normal line X and the movement axis Y' of the press dies 90, 91 is defined as a die movement angle E'. The movement axis of the press dies 90, 91 is selected to ensure that the die movement angle is constantly equal to or smaller than the open angle of the recess 40, as viewed along any cross-sectional plane that includes the normal line X. In other words, the movement axis of the press dies 90, 91 may be selected as desired, as long as the die movement angle is equal to or smaller than the open angle of the recess 40.

Accordingly, it is unnecessary to increase accuracy for manufacturing the press dies and selecting the die movement direction. That is, even if the press dies have a relatively low accuracy, the pipe frame 42 is reliably secured to the pivot holders 12, 14 through caulking. Further, designing of the press dies becomes simple. As a result, the cost for the press dies and the manufacturing cost of the pivot holders 12, 14 both decrease.

The axis Y of the pivot shaft 20 and the axis J of the pivot shaft 22 are non-parallel. However, the open angle of each recess 40 of one pivot holder is equal to or greater than the shaft angle of the corresponding pivot shaft and the shaft angle of the other pivot shaft, as viewed along any cross-sectional plane that includes the normal line X of the recess 40. Thus, the pivot shafts 20, 22 can be secured to the pipe frame 42 at one time, simply by moving two pairs of press dies for the pivot holders 12, 14 together along a common movement axis. Accordingly, caulking is completed with high accuracy in a relatively short time.

The bottom 40c of each recess 40 forms a portion of a spherical surface. Thus, a pressing portion of each press die is also shaped as a non-cornered spherical surface. Accordingly, when caulking is performed, reactive force does not act focally on any portion of the pipe frame 42, thus preventing the pipe frame 42 from being cracked. Further, since the spherical pressing portion does not easily wear, the caulking accuracy and strength of the press dies are maintained for a prolonged time.

The present invention may be embodied as follows.

The bottom 4c of each recess 40 does not necessarily have to form a portion of a spherical surface but may be a portion of an oval surface.

In the embodiment of FIGS. 1 to 7, the angle between the normal line X and the tangential line that corresponds to the open end 40a of the recess 40 is defined as the open angle. However, the open angle may be defined differently. For example, the angle between the normal line X and a certain portion of the wall of the recess 40 may be defined as the open angle. Further, each recess 40 is shaped and located such that the open angle is constantly greater than zero and equal to or greater than the shaft angle, as viewed along any cross-sectional plane that includes the normal line X. Also in this case, the same operation and advantages as those of the embodiment of FIGS. 1 to 7 are obtained.

More specifically, the angle between the normal line X and a certain portion of the wall of the recess 40 is defined as follows. That is, if a cross section of the wall of the recess 40 forms a straight line, the angle between the straight line and the normal line X is defined as the angle between the normal line X and the certain portion of the wall of the recess 40. Further, if a cross section of the wall of the recess 40 forms a curve, the angle between a tangential line that corresponds to a certain portion of the curve and the normal line X is defined as the angle between the normal line X and the certain portion of the wall of the recess 40.

If each opening end 40a is curved, a tangential line that corresponds to the opening end 40a is employed, as shown in FIG. 7. However, if the opening end 40a is not curved but is cornered, the tangential line that corresponds to the opening end 40a cannot be employed. If this is the case, it is effective to employ the angle between the normal line X and a certain portion of the wall of the recess 40.

The number of the recesses 40, which are formed in the corresponding fitting portions 36, 38 of the pivot holders 12, 14, is not restricted to eight. The number may be modified as long as each fitting portion 36, 38 has at least two recesses 40.

What is claimed is:

1. A wiper device comprising:
    a pair of pivot holders, wherein each pivot holder includes a fitting portion that extends along a fitting axis, and a plurality of recesses are formed in an outer side of each fitting portion;
    a pivot shaft, which is rotationally supported by each pivot holder, wherein a wiper arm is secured to each pivot shaft; and
    a frame, wherein the frame connects the pivot holders to each other, and a receiving portion in which each fitting portion is received is formed at each end of the frame;
    wherein the receiving portions are subjected to caulking with the fitting portions received in the corresponding receiving portions, such that a portion of each receiving portion that corresponds to each recess enters the recess, and the wiper device is characterized in that:
        each recess includes a curved bottom and a curved open end; and
        if, regarding each pivot holder, an angle between a normal line that corresponds to a maximum depth portion of each recess and a tangential line that corresponds to the open end of the recess is defined as an open angle while an angle between the axis of the corresponding pivot shaft and the normal line is defined as a shaft angle, the recess is shaped and located such that the open angle is constantly greater than zero and equal to or greater than the shaft angle, as viewed along any cross-sectional plane that includes the normal line.

2. The wiper device according to claim 1, wherein the bottom of each recess forms a portion of a spherical surface.

3. The wiper device according to claim 1, wherein each recess has a substantially conical shape.

4. The wiper device according to claim 1, wherein the frame is formed of metal, and each receiving portion plastically deforms such that the portion of the receiving portion that corresponds to each recess forms a projection that enters the recess, when caulking is performed on the receiving portion.

5. The wiper device according to claim 1, wherein each fitting portion is a solid shaft that has a circular cross-sectional shape, and each receiving portion has a hollow cylindrical shape for receiving the corresponding fitting portion.

6. The wiper device according to claim 1, wherein each pivot holder is formed of aluminum-based metal material through molding.

7. The wiper device according to claim 1 wherein the axis of one pivot shaft and the axis of the other are non-parallel with each other.

8. The wiper device according to claim 1 wherein the frame is a substantially straight pipe, and the pipe and the fitting portions are coaxial when the pivot holders are secured to the opposite ends of the pipe.

9. The wiper device according to claim 1, wherein the open angle of each recess of one pivot holder is equal to or greater than the shaft angle of the corresponding pivot shaft and the shaft angle of the other pivot shaft, as viewed along any cross-sectional plane that includes the normal line of the recess.

10. A wiper device comprising:
   a pair of pivot holders, wherein each pivot holder includes a fitting portion that extends along a fitting axis, and a plurality of recesses are formed in an outer side of each fitting portion;
   a pivot shaft, which is rotationally supported by each pivot holder, wherein a wiper arm is secured to each pivot shaft; and
   a frame, wherein the frame connects the pivot holders to each other, and a receiving portion in which each fitting portion is received is formed at each end of the frame;
   wherein the receiving portions are subjected to caulking with the fitting portions received in the corresponding receiving portions, such that a portion of each receiving portion that corresponds to each recess enters the recess, and the wiper device is characterized in that:
   each recess includes a curved bottom; and
   if, regarding each pivot holder, an angle between a normal line that corresponds to a maximum depth portion of each recess and a certain portion of a wall that forms the recess is defined as an open angle while an angle between the axis of the corresponding pivot shaft and the normal line is defined as a shaft angle, the recess is shaped and located such that the open angle is constantly greater than zero and equal to or greater than the shaft angle, as viewed along any cross-sectional plane that includes the normal line.

11. The wiper device according to claim 10, wherein the bottom of each recess forms a portion of a spherical surface.

12. The wiper device according to claim 10, wherein each recess has a substantially conical shape.

13. The wiper device according to claim 10, wherein the frame is formed of metal, and each receiving portion plastically deforms such that the portion of the receiving portion that corresponds to each recess forms a projection that enters the recess, when caulking is performed on the receiving portion.

14. The wiper device according to claim 10, wherein each fitting portion is a solid shaft that has a circular cross-sectional shape, and each receiving portion has a hollow cylindrical shape for receiving the corresponding fitting portion.

15. The wiper device according to claim 10, wherein each pivot holder is formed of aluminum-based metal material through molding.

16. The wiper device according to claim 10, wherein the axis of one pivot shaft and the axis of the other are non-parallel with each other.

17. The wiper device according to claim 10, wherein the frame is a substantially straight pipe, and the pipe and the fitting portions are coaxial when the pivot holders are secured to the opposite ends of the pipe.

18. The wiper device according to claim 10, wherein the open angle of each recess of one pivot holder is equal to or greater than the shaft angle of the corresponding pivot shaft and the shaft angle of the other pivot shaft, as viewed along any cross-sectional plane that includes the normal line of the recess.

* * * * *